United States Patent
Iwaki et al.

(10) Patent No.: US 10,230,281 B2
(45) Date of Patent: Mar. 12, 2019

(54) ROTATING ELECTRICAL MACHINE

(71) Applicant: Hitachi Automotive Systems, Ltd., Hitachinaka-shi, Ibaraki (JP)

(72) Inventors: Genzo Iwaki, Tokyo (JP); Shuya Hagiwara, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 146 days.

(21) Appl. No.: 14/910,447

(22) PCT Filed: May 28, 2014

(86) PCT No.: PCT/JP2014/064047
§ 371 (c)(1),
(2) Date: Feb. 5, 2016

(87) PCT Pub. No.: WO2015/019685
PCT Pub. Date: Feb. 12, 2015

(65) Prior Publication Data
US 2016/0181882 A1   Jun. 23, 2016

(30) Foreign Application Priority Data
Aug. 8, 2013  (JP) .................................. 2013-165181

(51) Int. Cl.
*H02K 3/34* (2006.01)

(52) U.S. Cl.
CPC .................................... *H02K 3/345* (2013.01)

(58) Field of Classification Search
CPC ...................................................... H02K 3/345
See application file for complete search history.

(56) References Cited

U.S. PATENT DOCUMENTS 4,247,978 A * 2/1981 Smith .................... H02K 3/345
29/596
6,147,430 A   11/2000 Kusase et al.
(Continued)

FOREIGN PATENT DOCUMENTS

CN        103618395 A      3/2014
DE   10 2012 001 487 A1   8/2012
(Continued)

OTHER PUBLICATIONS

Extended European Search Report issued in counterpart European Application No. 14835348.5 dated Apr. 12, 2017 (9 pages).
(Continued)

*Primary Examiner* — Terrance Kenerly
(74) *Attorney, Agent, or Firm* — Crowell & Moring LLP

(57) ABSTRACT

The present invention facilitates size and weight reduction by enhancing a coil space factor. A rotating electrical machine according to the present invention is provided with a core having a slot that is continuous in the axial direction, a winding provided within the slot, and an insulating member provided between the slot and the winding and is characterized in that a first pyramid-frustum surface of the insulating member that is provided on the side of the insulating member that is inserted into the slot and/or a second pyramid-frustum surface that is provided on the side of the insulating member into which the winding is inserted is provided at an axial end of the core.

5 Claims, 15 Drawing Sheets

(56) References Cited

U.S. PATENT DOCUMENTS

| | | | | |
|---|---|---|---|---|
| 8,415,853 B2 * | 4/2013 | Jang | ............... | H02K 3/522 |
| | | | | 310/214 |
| 8,558,427 B2 * | 10/2013 | Rhoads | ............ | H02K 3/34 |
| | | | | 310/214 |
| 2002/0130581 A1 * | 9/2002 | Arai | ............... | H02K 1/146 |
| | | | | 310/215 |
| 2011/0109189 A1 * | 5/2011 | Taema | ............ | H02K 3/345 |
| | | | | 310/215 |
| 2012/0194028 A1 | 8/2012 | Rhoads et al. | | |
| 2012/0326550 A1 | 12/2012 | Kinpara et al. | | |
| 2014/0183985 A1 | 7/2014 | Kurahara et al. | | |
| 2015/0280508 A1 * | 10/2015 | Hirota | ............ | H02K 3/345 |
| | | | | 310/215 |

FOREIGN PATENT DOCUMENTS

| | | | | |
|---|---|---|---|---|
| JP | 62-54551 U | 4/1987 | | |
| JP | 63-33347 U | 3/1988 | | |
| JP | 01027892 * | 1/1989 | ............ | B26D 1/24 |
| JP | 2002-165421 A | 6/2002 | | |
| JP | 2003-70201 A | 3/2003 | | |
| JP | 2003-88028 A | 3/2003 | | |
| JP | 2013-9566 A | 1/2013 | | |
| JP | 2013-143819 A | 7/2013 | | |
| WO | WO 2013/008568 A1 | 1/2013 | | |

OTHER PUBLICATIONS

International Search Report (PCT/ISA/210) issued in PCT Application No. PCT/JP2014/064047 dated Aug. 26, 2014 with English translation (Four (4) pages).

* cited by examiner

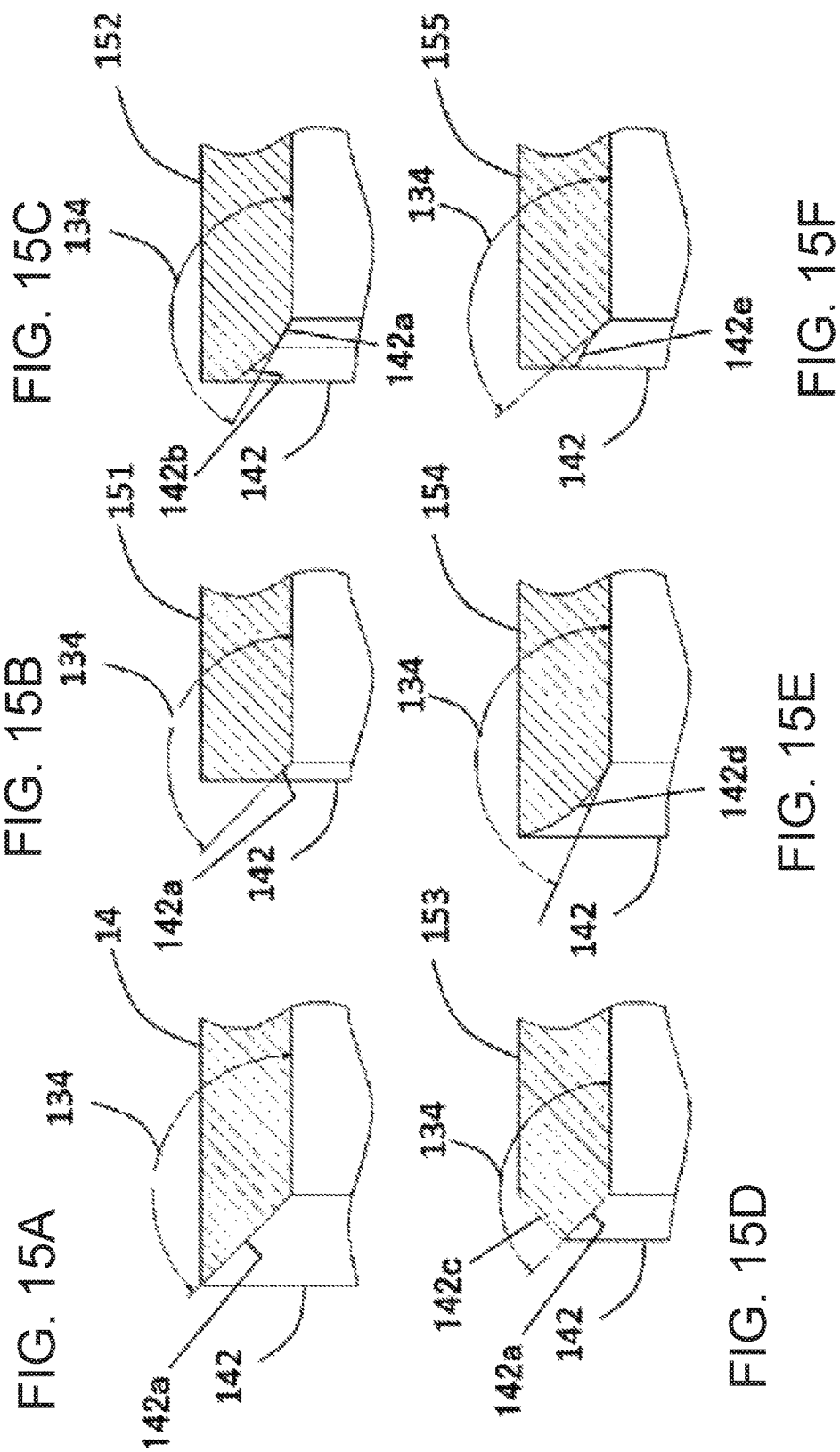

ROTATING ELECTRICAL MACHINE

TECHNICAL FIELD

The present invention relates to a rotating machine.

BACKGROUND ART

In a hybrid car or an electric car which have become popular in recent years, downsizing and weight reduction of a motor which is a power source are strongly required. As one means of downsizing, there is a concept of enhancing a pacing factor of conductors in a slot of a stator coil of a rotating machine, to enhance a power density. To realize this, instead of a conventional structure in which continuous magnet wire or enameled wire is assembled into a slot, a so-called segment-coil-winding technique is used. In the segment-coil-winding technique, a coil conductor is divided into a large number of segment coils which are bent into a predetermined shape and assembled into a slot and then the segment conductors are electrically connected to each other.

Meanwhile, the hybrid car and the electric car are based on the premise that they are motor-driven by an inverter. As driving voltage of the motor-driving inverter is increased, in the stator coil of the segment-coil-winding technique, insulating paper (slot liner) is inserted in between segment coil/stator core and between different phase coils in the segment winding in the slot to secure electrical insulation of the stator core and between coil phases (see PTL 1).

CITATION LIST

Patent Literature

PTL 1: JP 2002-165421 A

SUMMARY OF INVENTION

Technical Problem in the stator coil assembly, however, since the slot liner is interposed, when the slot liner is inserted into the slot and the segment coil is inserted into the slot liner, there is fear that the slot liner is damaged and insulating failure is prone to occur. Further, since it is necessary to protide an insertion gap, it is difficult to enhance a packing factor of coils (ratio of coil conductor cross sectional area and slot cross sectional area in slot).

Solution to Problem

A rotating machine of the present invention is characterized in that an insulating material is provided between a slot and a winding of the rotating machine, and a first inclined surface of the insulating material provided on an insertion side into the slot and/or a second inclined surface provided on an insertion side of the winding is provided on an end in an axial direction of a core.

Advantageous Effects of Invention

According to the present invention, since a packing factor of coils is enhanced, it is possible to realize downsizing and weight reduction of a rotating machine.

BRIEF DESCRIPTION OF DRAWINGS

FIGS. 15A to 15F are diagrams illustrating a modification of a concave end 142.

DESCRIPTION OF EMBODIMENTS

One embodiment of a rotating machine according to the present invention will be described. The invention will be described based on the one embodiment and Comparative Example. In each of the embodiment and Comparative Example is for a stator core composed of a laminated core of a lamination thickness of 90 mm of a punched electromagnetic steel place corresponding to JIS 35A300 grade in which an outer diameter is 245 mm, an inner diameter is 200 mm and the number of slots is 72 for a hybrid car driving motor of 3-phase 12-poles to which a segment-coil-winding technique of rated driving voltage 300Vdc-current 400 Arms is applied.

Figure 1:
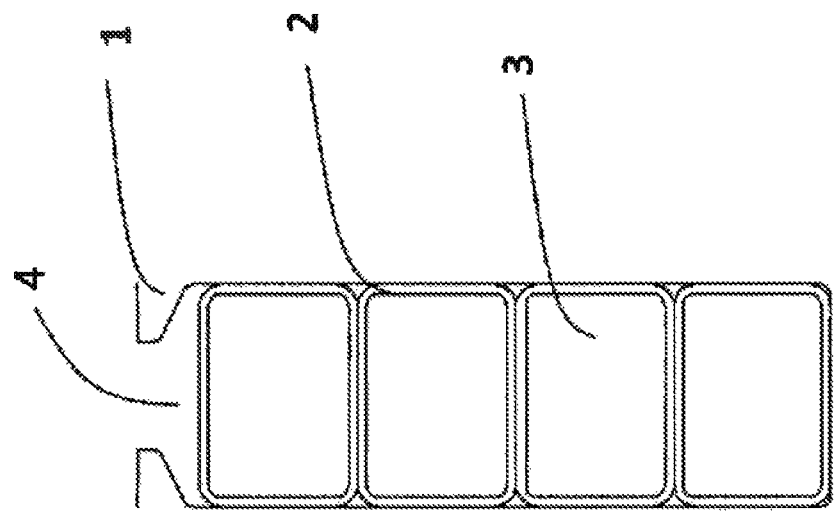
FIG. 1 is a diagram illustrating an interior configuration of a slot in a stator core of a hybrid car driving motor to which the present invention is applied.

FIG. 1 illustrates an interior configuration of a slot in a stator core of a hybrid car driving motor used in this embodiment and Comparative Example. Segment coils 3 formed from rectangular enameled wire are used as the stator core (winding). Since the rectangular segment coils 3 are densely accommodated in a slot 4, the slot 4 is of a substantially rectangular shape having a constant width, and four segment coils 3 forming the stator coil are inserted into the slot 4.

A slot liner 2 is an insulating member used for insulation against the stator core 1 and for insulation between different phase coils. The slot liner 2 is placed in the slot 4 such that the slot liner 2 extends in an axial direction of a core of the stator core 1 which is a depth direction of a paper sheet of FIG. 1. The present invention is based on the premise that a conventional slot liner having a flat slot liner end is used, a rectangular insulating line coated with a polyamideimide insulating layer having a thickness of 0.05 mm is used on a rectangular conductor having a short side of 2.4 mm, a long side of 3.3 mm and corner beveling radius of 0.3 mm. Insulating paper of a three layered structure of aramid/PET/aramid having a thickness of 0.17 mm is formed into a rectangular tube shape and is used as the slot liner. A width of the slot, a depth of a parallel portion, and a cross section area in the slot are 4.14 mm, 12.0 mm and 52.0 mm2, respectively, and a packing factor of coils is 60.3%.

The present invention was applied to this stator core, and it was checked whether a stator core having high packing factor of coils could be manufactured. As a verification trial product, a rectangular insulating line coated with a polyamideimide insulating layer having a 0.05 mm was used on a rectangular conductor having a short side of 2.53 mm, a long side of 3.6 mm and a corner beveling radius of 0.3 mm. Placement of the slot liner was the same as that shown in FIG. 1, and the slot liner was formed from insulating paper having the same configuration and the same thickness. The packing factor of coils in the configuration in this slot is 69.5% which is increased by about 10% as compared with the conventional configuration.

In the verification trial product, assembling performance of a segment coil formed from the rectangular insulating conductor and a stator core configured by the slot liner of the present invention were compared and considered in a car assembling line without changing a size of a trial stator core. More specifically, the generation number of insertion failures when the slot was inserted into the slot liner and when the segment coil was inserted into a slot liner were compared with each other, thereby evaluating possibility of manufacture of the stator cores.

A length of the slot liner was 96 mm, and the slot liner lies off from both end surfaces of a core slot by 3 mm because a prevention layer against creeping discharge is provided between the stator core and the segment coil.

Figure 2:
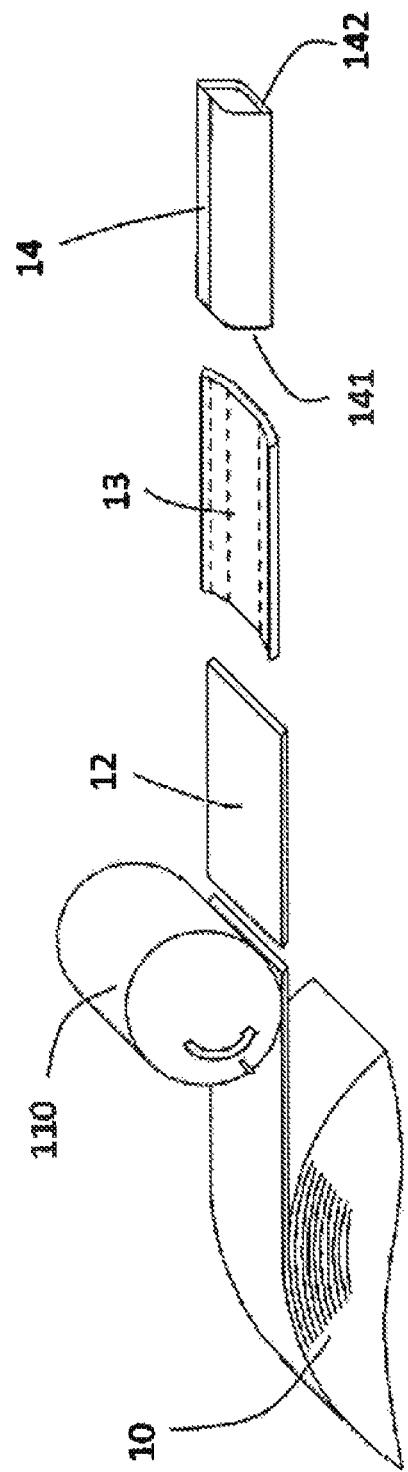
FIG. 2 is a diagram illustrating one example of a manufacturing process of a slot liner.

FIG. 2 shows one example of a manufacturing process of a slot liner 14. As shown in FIG. 2, in the manufacturing process of the slot liner 14, sheet-shaped insulating paper is pulled out from a hoop of raw insulating paper 10 which is cut into a predetermined width, insulating paper 12 having a predetermined length is cut and bent-formed by a rotary cutter 110. According to this, the slot liner 14 is manufactured. The rotary cutter 110 is used for cutting the insulating paper into a constant length and according to this, a cut sectional surface inclines with respect to a sending direction of the insulating paper. The insulating paper 12 after the constant length cutting is subject to fold-bending, and it is formed into a rectangular tube shaped slot liner 14. Broken lines shown in the insulating paper 13 which is folded and bent show creases.

Figure 3:
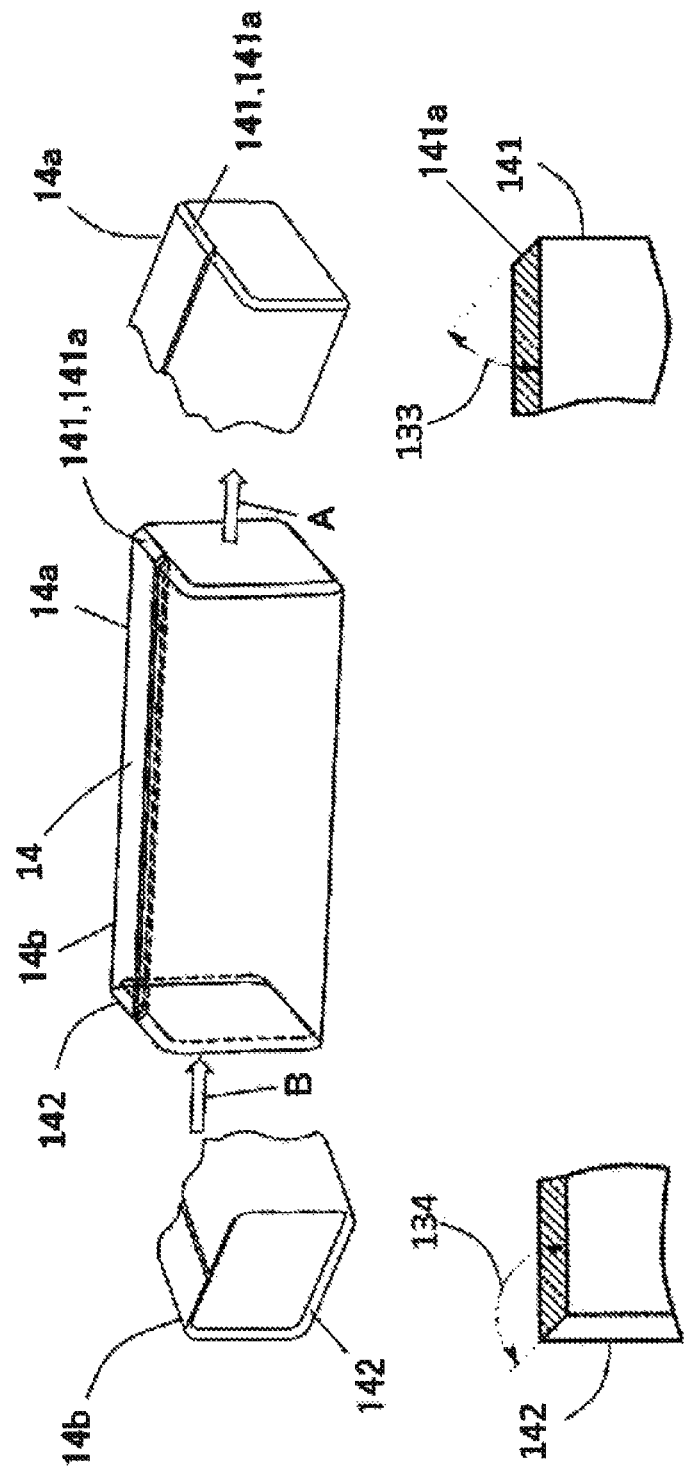
FIG. 3 is diagram including a perspective view of an entire rectangular tube shaped slot liner formed by a first manufacturing method, a perspective view in the vicinity of a convex end and a concave end, and a sectional view of the convex end and the concave end.

FIG. 3 is diagram including a perspective view of the entire rectangular tube shaped slot liner 14 formed by a first manufacturing method shown in FIG. 2, a perspective view in the vicinity of a convex end 141 and later-described concave end 142, and sectional view of the convex end 141 and the concave end 142. A perspective view of the entire rectangular tube shaped slot liner 14 in FIG. 3 is a perspective view of the rectangular tube shaped slot liner 14 as viewed from an insertion direction of the slot liner 14 into the stator core 1.

The convex end 141 is formed on an insertion side end (stator core insertion side end) 14a of the slot liner 14 into the stator core 1. The concave end 142 is formed in an end (segment coil insertion side end) 14b of the slot liner 14 on a side opposite from the stator core insertion side end 14a. An arrow A shown in the vicinity of the convex end 141 shows an insertion direction of the slot liner 14 into the stator core 1. An arrow B shown in the vicinity of the concave end 142 shows an insertion direction of the segment coil 3 into the slot liner 14.

The convex end 141 includes an inclined surface 141a for making it easy to insert the rectangular tube shaped slot liner 14 into the stator core 1. The inclined surface 141a is an oblique surface having an apex facing in an insertion direction into the stator core 1. Hence, an outer peripheral length of the rectangular tube shaped slot liner 14 in the convex end 141 becomes shorter from the segment coil insertion side end 14b toward the stator core insertion side end 14a. Since the inclined surface 141a inclines such that the convex end 141 is narrowed in the insertion direction into the stator core 1 in this manner, it becomes easy to insert the rectangular tube shaped slot liner 14 into the slot 4. According to this, it is possible to prevent the rectangular tube shaped slot liner 14 from being damaged when it is inserted into the slot 4. Therefore, since it is possible to enhance the packing factor of coils by reducing the thickness of the rectangular tube shaped slot liner 14, it is possible to realize downsizing and weight reduction of the rotating machine.

The concave end 142 includes the inclined surface 142a for making it easy to insert the segment coil 3 into the rectangular tube shaped slot liner 14. The inclined surface 142a is an oblique surface having an apex facing the insertion direction into the stator core 1. Hence, an inner peripheral length of the rectangular tube shaped slot liner 14 in the concave end 142 becomes longer from the stator core insertion side end. 14a toward the segment coil insertion side end 14b. Since the inclined surface 142a inclines such that an inner diameter of the rectangular tube shaped slot liner 14 in the concave end 142 becomes greater toward a direction opposite from the insertion direction of the segment coil 3 in this manner, it becomes easy to insert the segment coil 3 into the rectangular tube shaped slot liner 14. According to this, it is possible to prevent the rectangular tube shaped slot liner 14 from being damaged when the segment coil 3 is inserted into the rectangular tube shaped slot liner 14. Therefore, since the packing factor of coils can be enhanced by increasing the cross section area of the segment coil 3 for example, it is possible to realize downsizing and weight reduction of the rotating machine.

The inclined surface 141a and the inclined surface 142a are cut cross sections formed by being cut by the rotary cutter 110. The convex end 141 corresponds to a cut cross section on the side of the rotary cutter of the constant length cutting insulating paper 12 in FIG. 2, and the concave end 142 corresponds to a cut cross section opposite from the former cross section, and the convex end 141 and the concave end 142 have gradient angles with respect to the insertion direction of the slot liner. Here, a gradient angle 133 of the convex end 141 of the rectangular tube shaped slot liner 14 is defined as a first gradient angle, and a gradient 134 of the concave end 142 is defined as a second gradient angle.

The first gradient angle 133 is an angle formed between the inclined surface 141a and an inner peripheral surface of the rectangular tube shaped slot liner 14, and is an angle of a cross section of the convex end 141 when the rectangular tube shaped slot liner 14 is cut parallel to the insertion direction of the slot liner as shown in FIG. 3. The second gradient angle 134 is an angle formed between the inclined surface 142a and the inner peripheral surface of the rectangular tube shaped slot liner 14, and is an angle of a cross section of the concave end 142 when the rectangular tube shaped slot liner 14 is cut parallel to the insertion direction of the slot liner as shown in FIG. 3.

As described above, the inclined surface 141a is for making it easy to insert the rectangular tube shaped slot liner 14 into the stator core 1. Hence, the first gradient angle 133 is an acute angle. Similarly, the inclined surface 142a is for making it easy to insert the segment coil 3 into the rectangular tube shaped slot liner 14. Hence, the second gradient angle 134 is an obtuse angle. The first gradient angle 133 and the second gradient angle are different angles.

That is, the first gradient angle 133 is the acute angle, and when the first gradient angle 133 is formed into the rectangular tube shape, the inclined surface 141a faces an outer side (inner side of slot 4) of the rectangular tube shaped slot liner 14. According to this configuration, the rectangular tube shaped slot liner 14 is easily inserted into the stator core 1. According to this, since it is possible to enhance the packing factor of coils as described above, it is possible to realize downsizing and weight reduction of the rotating machine.

Further, the second gradient angle 134 is the obtuse angle, and when the second gradient angle 134 is formed into the rectangular tube shape, the inclined surface 142a faces an inner side (toward segment coil 3) of the rectangular tube shaped slot liner 14. According to this configuration, it becomes easy to insert the segment coil 3 into the rectangular tube shaped slot liner 14. According to this, since it is possible to enhance the packing factor of coils as described above, it is possible to realize downsizing and weight reduction of the rotating machine.

When the inclined surface 141a and the inclined surface 142a are formed by one cutting operation like the rotary cutter 110, the first gradient angle 133 and the second gradient angle are a supplementary angle relation.

Figure 4:
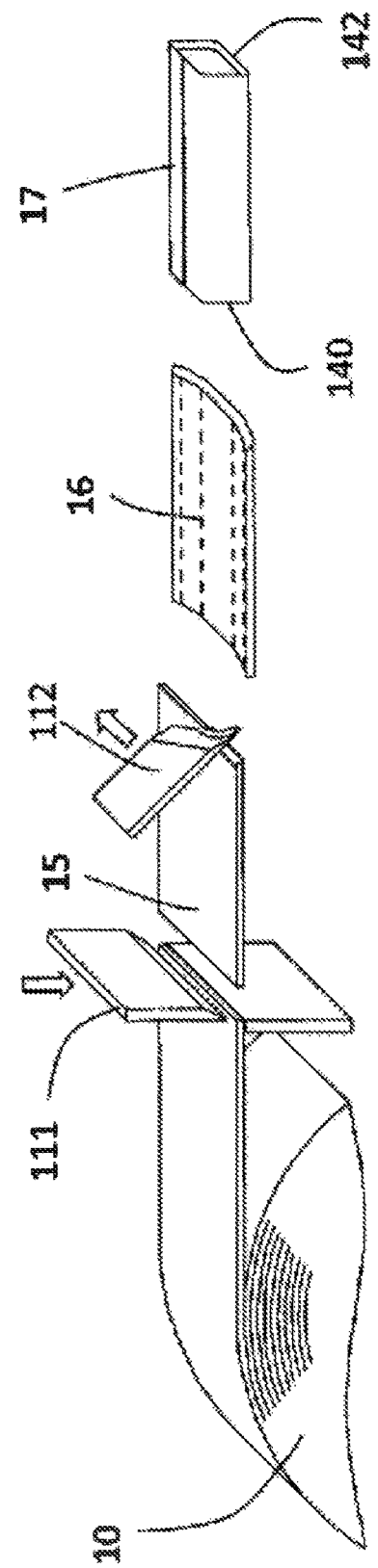
FIG. 4 is a diagram illustrating a second manufacturing method of the slot liner of the invention using shearing.

FIG. 4 shows a second manufacturing method of the slot liner of the invention using shearing. In the second manufacturing method shown in FIG. 4, insulating paper which is sent out from raw insulating paper 10 is cut into a constant length by a cutting blade 111 which moves perpendicularly to a sending-out direction of insulating paper. In this case, cut cross sections of both ends of the insulating paper (constant length insulating paper) 15 after constant length cutting are perpendicular to the sending-out direction of the insulating paper. Hence, after the constant length cutting, only one of the cut cross sections which is further from the cutting blade 111 is trimmed using a slide cutter 112 which is inclined with respect to the sending-out direction of the insulating paper. According to this, a cut cross section which is inclined with respect to the sending-out direction of the insulating paper is formed. The trimmed constant length insulating paper 15 is subjected to fold-bending like the first manufacturing method shown in FIG. 2, and is formed into a rectangular tube shaped slot liner 17.

Figure 5:
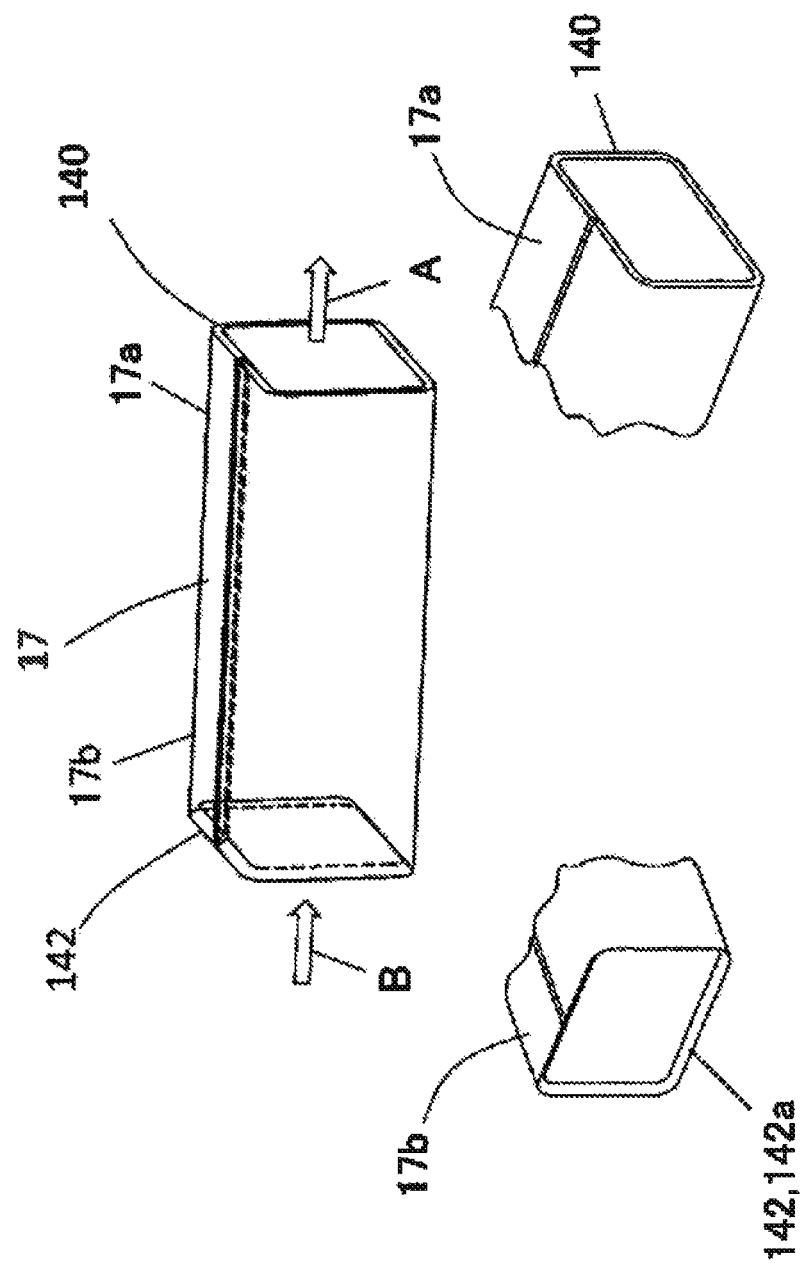
FIG. 5 is a diagram including a perspective view of an entire rectangular tube shaped slot liner formed second manufacturing method, and perspective view in the vicinity of the concave end and a later-described flat end.

FIG. 5 is a diagram including a perspective view of the entire rectangular tube shaped slot liner 17 formed by the second manufacturing method shown in FIG. 4, and perspective view in the vicinity of the concave end 142 and a later-described flat end 140. The flat end 140 which is perpendicular to the insertion direction into the stator core 1 is formed on a stator core insertion side end 17a of the rectangular tube shaped slot liner 17. The concave end 142 is formed in a segment coil insertion side end 17b of the rectangular tube shaped slot liner 17. In the rectangular tube shaped slot liner 17, first gradient in the flat end 140 is 90°.

Figure 6:
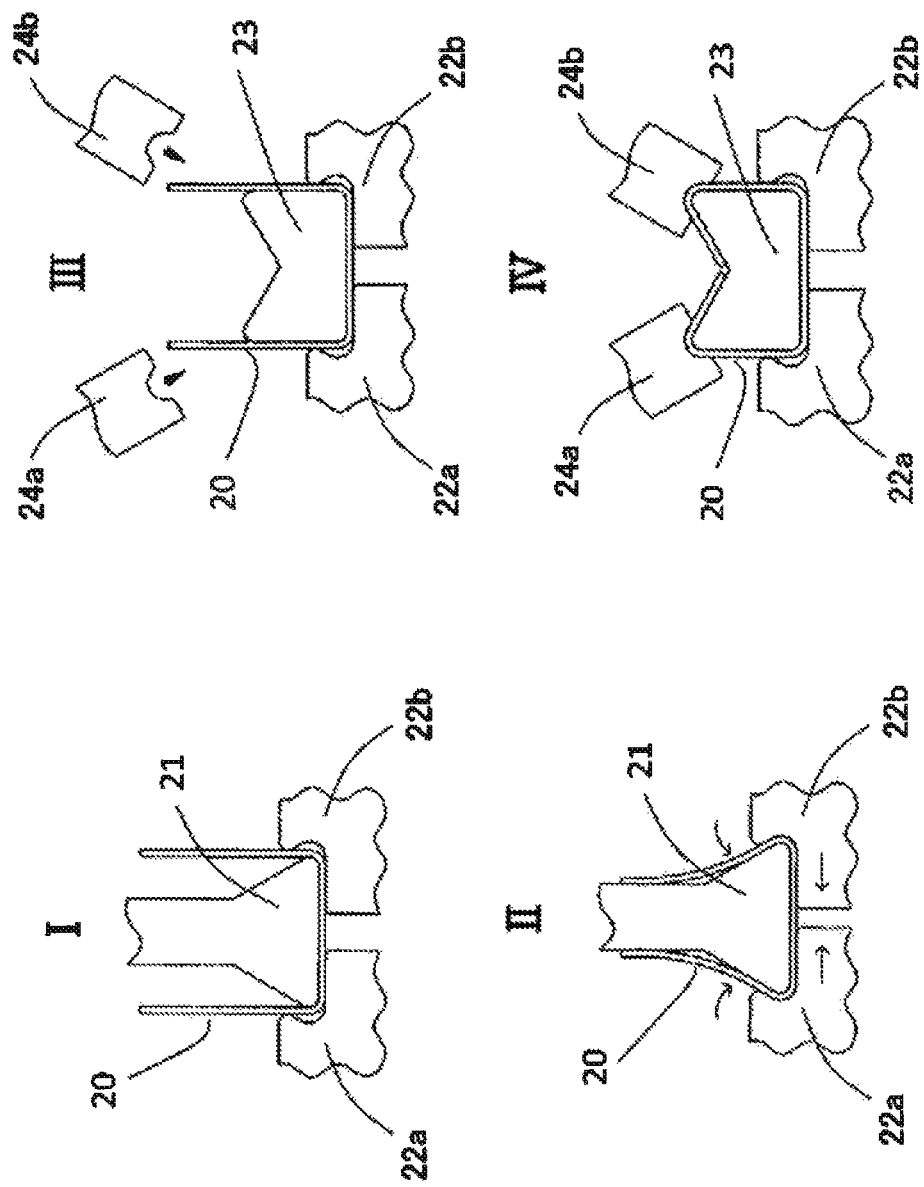
FIG. 6 is a schematic diagram illustrating one example of a fold-bending method of insulating paper which is cut into a constant length.

FIG. 6 is a schematic diagram illustrating one example of a fold-bending method of insulating paper which is cut into a constant length. Roman numerals in FIG. 6 show a working sequence. Constant length cutting insulating paper 20 is conveyed onto bottom bending dies 22a and 22b, and is pushed and bent by a pressing die 21 and is placed into the bottom bending dies 22a and 22b (I). Thereafter, the constant length cutting insulating paper 20 is over-bent by movement of the bottom bending dies 22a and 22b in a central axial direction thereof and according to this, the constant length cutting insulating paper 20 is formed into a predetermined bending angle (90° in this case) (II).

After the formation process of the bottom is completed, an upper portion-bending mandrel 23 is inserted (III), the upper shoulder parts are over-bent by a bending die for both upper shoulder parts 24a and 24b (IV). After the bending operation of the upper shoulder parts is completed, the over-bent upper shoulder parts are spring-backed, and the rectangular tube shaped slot liner is formed. The upper portion formed and bent mandrel 23 is recovered after the slot liner is formed, and the mandrel 23 is repeatedly used.

—Concerning a Result of the Verification Trial Product—

A result of the verification trial product of the stator core using various kinds of slot liners will be described with reference to the following Table 1. In the verification trial product, the number of stator core assembly is one in each of Examples and Comparative Example. In Examples to which the present invention is applied, three kinds of, i.e., total six kinds of slot liners manufactured by the first and second manufacturing methods were used. In Examples 1 to 3 to which the invention is applied, slot liners manufactured in the first manufacturing method were used, and the first gradient angles 133 were set to 20°, 45° and 70°, and the second gradient angles 134 were set to 160°, 135° and 110°, respectively. The second gradient angle 134 is the supplementary angle with the first gradient angle 133.

In Examples 4 to 6 to which the present invention is applied, slot liners manufactured in the second manufacturing method were used, all of the first gradient angles were set to 90°, and second gradients on the insertion side segment coil were set to 20°, 45° and 70°, respectively, as in Examples 1 to 3.

In the slot liners used in Examples 1 to 3, the gradient angles were set by adjusting a blade angle of the rotary cutter 110 shown in FIG. 2. In the slot liners used in Examples 4 to 6, the gradient angles were set by adjusting an inclination angle of the slide cutter 112 shown in FIG. 4.

In Comparative Example, a conventional slot liner in which both the first and second gradient angles are 90° was used. The slot liner used in Comparative Example was manufactured by the second manufacturing method excluding a trimming process by the slide cutter 112.

In Table 1, the number of insertion failures of slot liners is the number of insertion failures generated when the slot liners of Examples and Comparative Example are inserted into the slot 4. The number of insertion failures of the segment coils is the number of insertion failures generated when the segment coils 3 are inserted into the slot liners of Examples and Comparative Example which are inserted into the slot 4.

As shown in Table 1, in all of Examples 1 to 6 to which the present invention was applied, insertion failures of the slot liners and the segment coils were not generated, and it was found that it was possible to assemble stator cores having high packing factor by applying the invention. In contrast, in Comparative Example, although insertion failure was not generated when the slot liner was inserted into the slot 4, crush of the slot liner was generated as the number of inserting time of the segment coil was increased when the segment coil 3 was inserted into the slot liner, and many insertion failures of the segment coil were generated. According to this, it was found apparent that it was difficult to manufacture a stator coil having high packing factor using the conventional slot liner having a flat cut end surface (first and second gradient angles are 90°).

TABLE 1

| Items | Example 1 | Example 2 | Example 3 | Example 4 | Example 5 | Example 6 | Comparative Example |
|---|---|---|---|---|---|---|---|
| First gradient angle of slot liner | 20° | 45° | 70° | 90° | 90° | 90° | 90° |
| Second gradient angle of slot liner | 160° | 135° | 110° | 160° | 135° | 110° | 90° |
| Number of insertion failures of slot liner | 0 | 0 | 0 | 0 | 0 | 0 | 0 |
| Number of insertion failures of segment coil | 0 | 0 | 0 | 0 | 0 | 0 | 65 |

Figure 7:
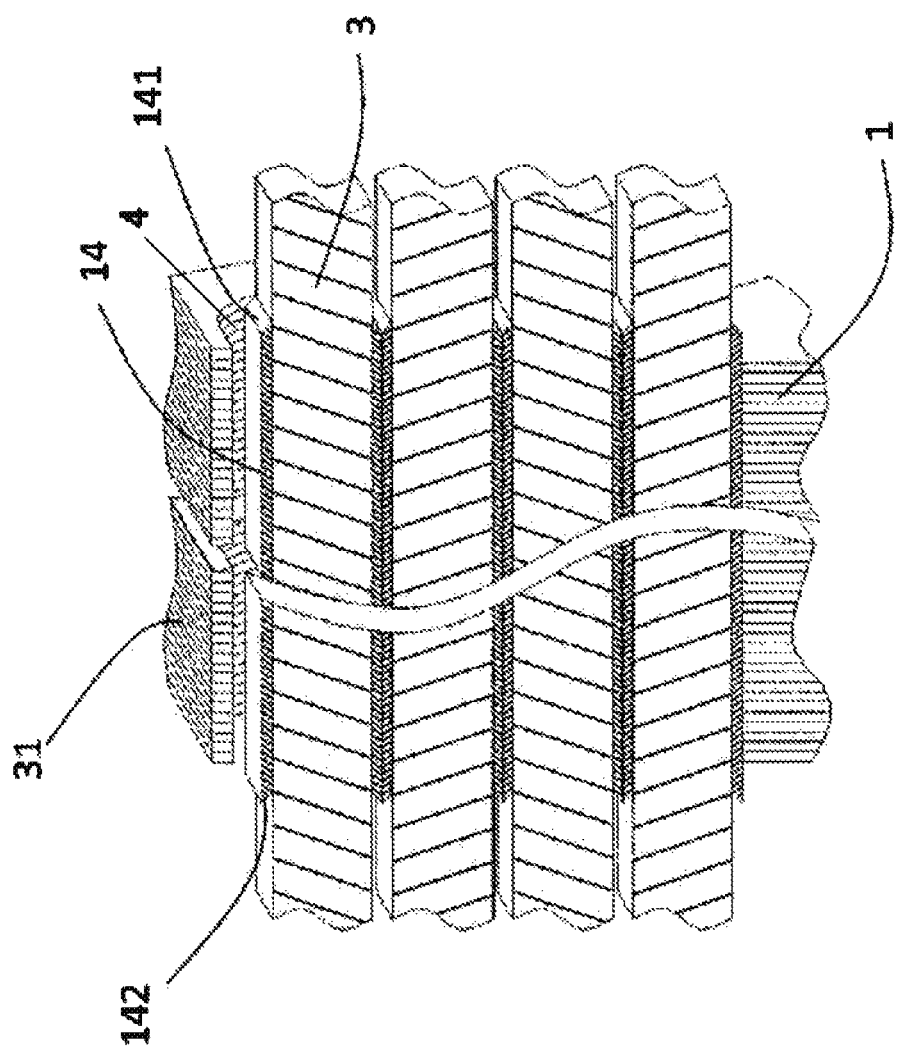
FIG. 7 is a diagram illustrating an interior vertical sectional configuration of a slot of a stator assembled in Example 2.

FIG. 7 is a diagram illustrating an interior vertical sectional configuration of the slot of the stator assembled in the above-described Example 2, and illustrating a stator core innermost surface 31. Connecting portions 3a (see FIG. 8) of the segment coils 3 are placed on the side of the convex end 141 having the first gradient 133 of the slot liner, and a folded-back portion 3b (see FIG. 8) is placed on the side of the concave end 142 having the second gradient 134 of the slot liner.

Figure 8:
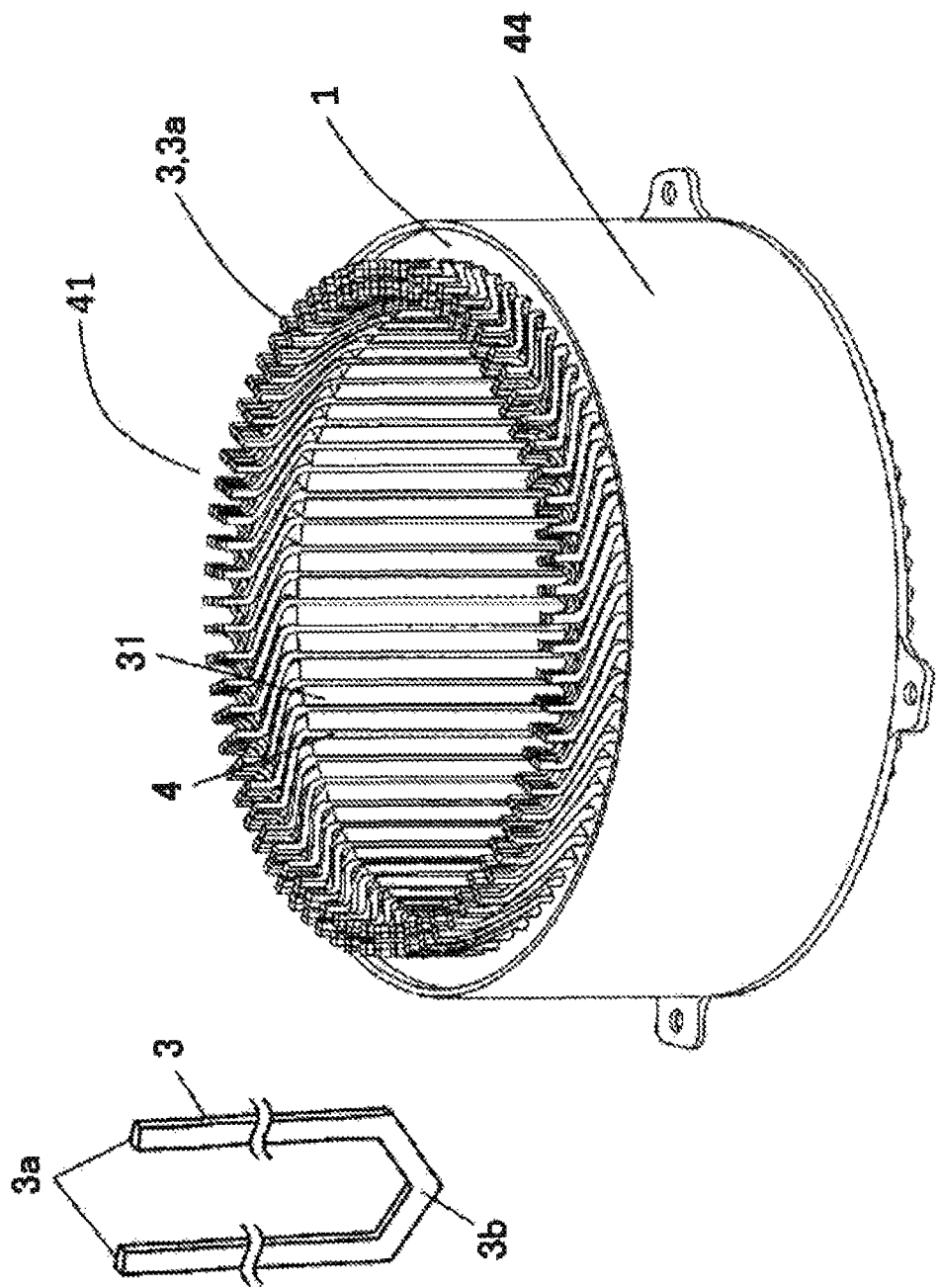
FIG. 8 is a diagram including a perspective view of the stator of a hybrid car motor to which the invention is applied, and a perspective view of a segment coil before it is inserted into a stator core.

FIG. 8 is a diagram including a perspective view of a stator 41 of the hybrid car motor to which the present invention is applied, and a perspective view of the segment coil 3 before it is inserted into the stator core 1. The stator 41 shown in FIG. 8 is manufactured by a segment-coil-winding technique having a high packing factor to which the present invention is applied. The stator 41 is fitted into a housing 44.

When the segment coils 3 are inserted into the stator core 1, the connecting portions 3a of the segment coil are inserted into the segment coil insertion side end 14b of the rectangular tube shaped slot liner 14 which has already been inserted into the stator core 1 (slot 4). Hence, in the segment coils 3 after they are inserted into the stator core 1, the connecting portions 3a project outward of the stator core insertion side end 14a, and the folded-back portion 3b projects outward of the segment coil insertion side end 14b as described above.

In the segment coils 3 after they are inserted into the stator core 1, the connecting portions 3a are bent into predetermined shapes for connecting the segment coils to each other. In the stator 41 shown in FIG. 8, the connecting portions 3a are bent into the predetermined shapes. Thereafter, the segment coils are welded to each other through the connecting portions 3a, and the stator 41 shown in FIG. 8 is electrically connected.

Figure 9:
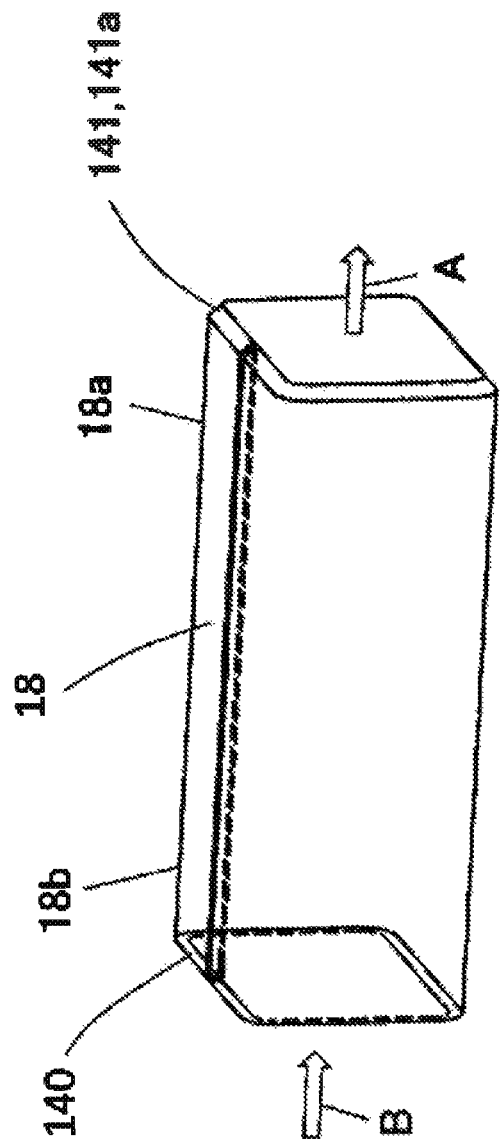
FIG. 9 is a diagram illustrating a modification of the slot liner.

In the rectangular tube shaped slot liner 17 of the embodiment, since insertion of the segment coil 3 into the slot liner 17 is given priority over insertion of the slot liner 17 into the stator core 1, the segment coil insertion side end 17b is provided with the concave end 142 and the stator core insertion side end 17a is not provided with the convex end 141. However, the present invention is not limited to this. For example, like a slot liner 18 shown in FIG. 9, easiness of the inserting operation into the stator core 1 may be given priority, a segment coil insertion side end 18b may not be provided with the concave end 142 and a stator core insertion side end 18a may be provided with the convex end 141. In this case, the stator core insertion side end 18a becomes the convex end 141 having first gradient and the segment coil insertion side end 18b becomes the flat end 140.

Figure 10:
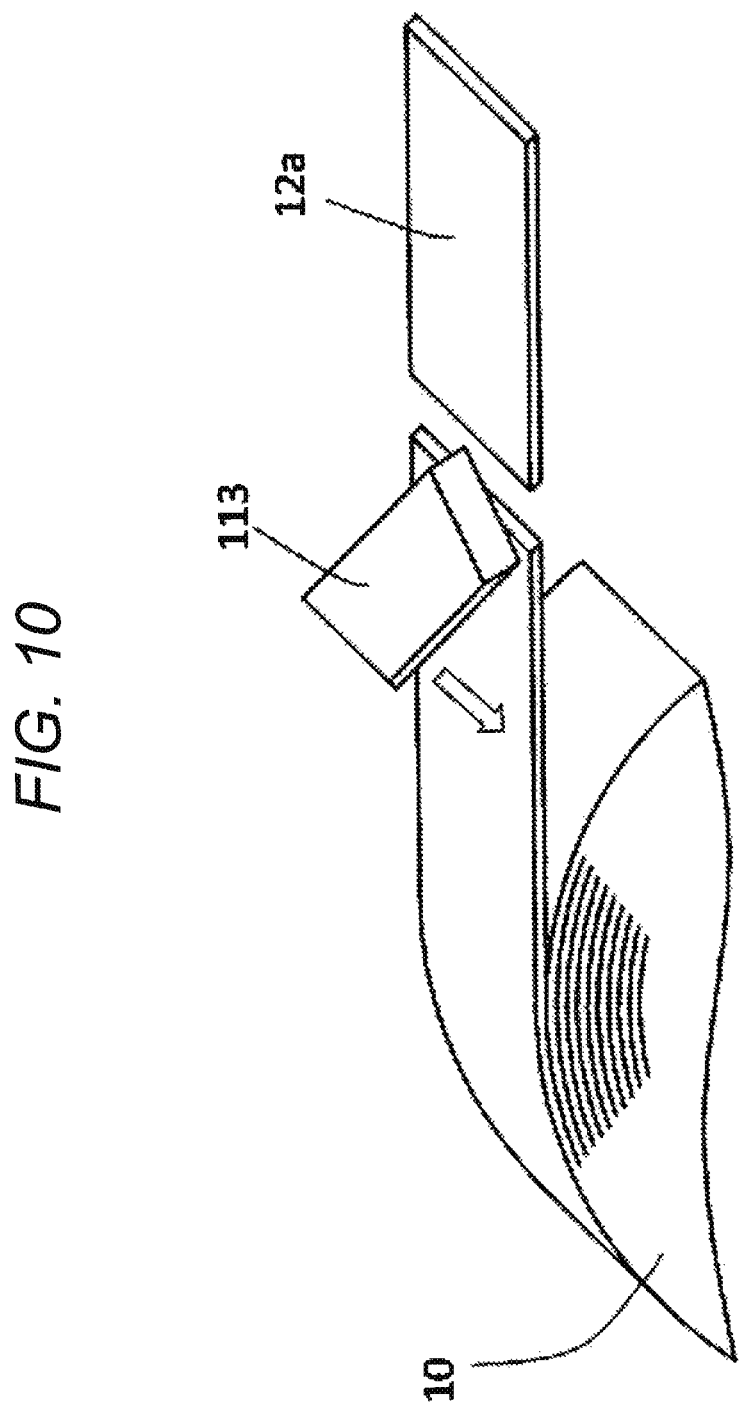
FIG. 10 is a diagram illustrating a working method of the slot liner.

As a working method of the slot liner used in the present invention, it is possible to employ a method used for cutting a slide cutter 113 into a constant length instead of the rotary cutter 110 as shown in FIG. 10. In this case, in a cut cross section of insulating paper 12a which is cut into a constant length, both end surfaces in the sending-out direction generated by a cutting incline with respect to the sending-out direction. Laser cutting can also be applied to the technique for cutting such that both end surfaces in the sending-out direction generated by cutting incline with respect to the sending-out direction.

Figure 11:
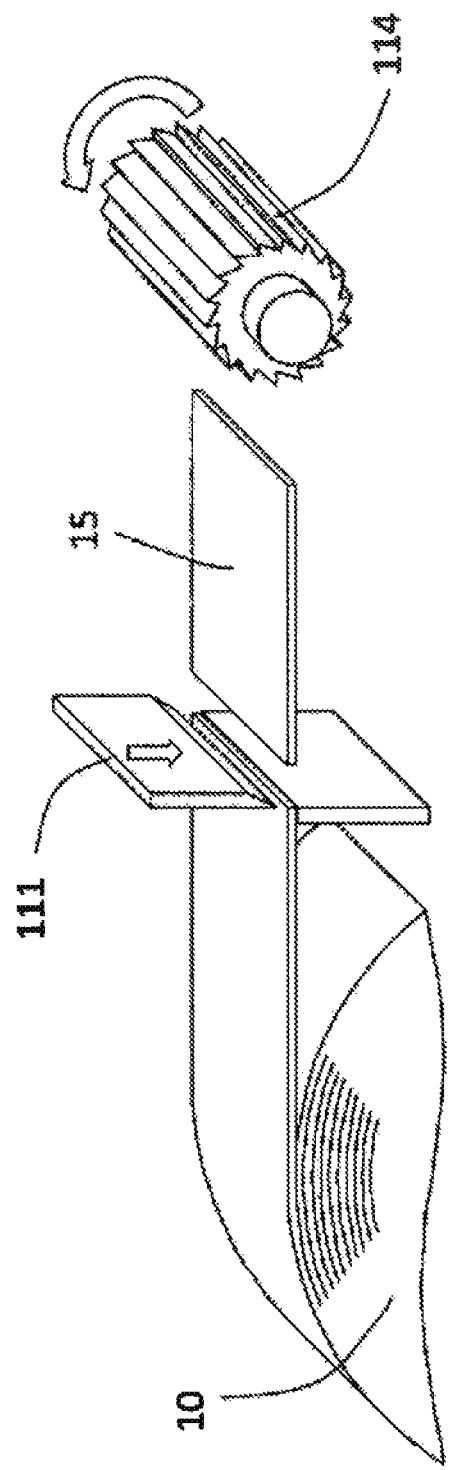
FIG. 11 is a diagram illustrating a working method of the slot liner.

When the cutting operation is carried out by general shearing, although a cut cross section of the insulating paper is inclined by the slide cutter 112 as shown in FIG. 4 in the above-described embodiment, it is possible to form the cut cross section which inclines with respect to the sending-out direction by abutting a plain milling cutter 114 against one or both of end surfaces in the sending-out direction as shown in FIG. 11.

The rectangular tube shaped slot liner 14, 17, 18 was formed by bending after the raw insulating paper 10 is cut into the constant length in the embodiment. However, the forming method of the rectangular tube shaped slot liner is not limited to this, and it is possible to employ such a technique that insulating paper which is sent out from the hoop of raw insulating paper 10 is formed into the shape of the rectangular tube shaped slot liner by roll forming and then, it is cut into the constant length and is inserted into the slot 4. A disc saw or a metal saw is used for cutting, into a constant length, a slot liner which is formed into the rectangular tube shape, but the slot liner which is cut by any of the saws has the flat end 140.

Figure 12:
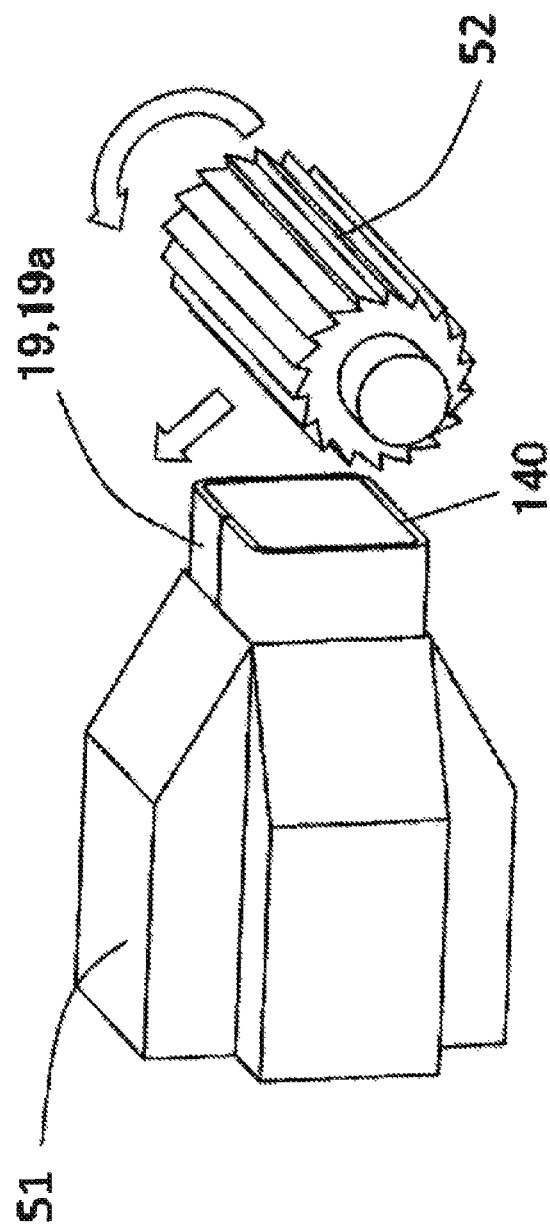
FIG. 12 is a diagram illustrating a working method of the slot liner.

To apply the present invention to a slot liner 19 manufactured by this technique, it is necessary to process (work) the flat end. FIG. 12 is a diagram illustrating a technique for forming the convex end 141 on a stator core insertion side end 19a. A halfway product of the slot liner 19 which is cut into the constant length after it is formed into a shape of the rectangular tube shaped slot liner by roll forming is grasped by a slot liner holder 51, a plain milling cutter 52 is obliquely moved on a stator core insertion side end 19a whose end projects by a predetermined length, thereby forming an inclined portion on one side of the slot liner end. When many sides should be inclined, it is only necessary to rotate the slot liner holder 51 and repeat this operation.

Figure 13:
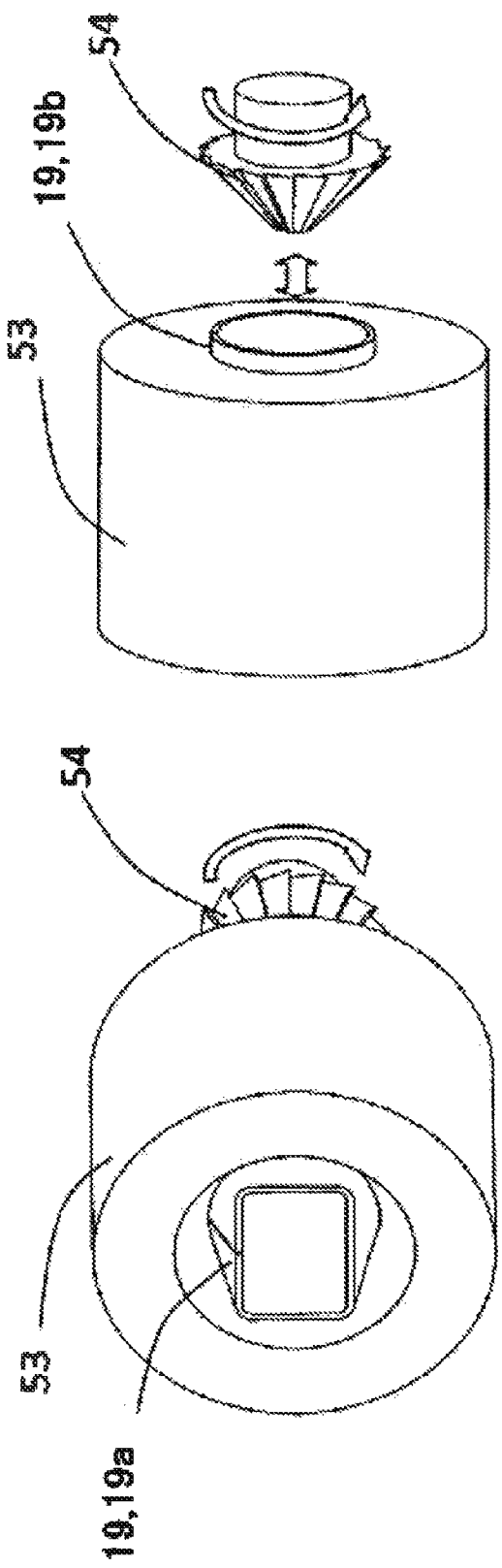
FIG. 13 is a diagram illustrating a working method of the slot liner.

To form a segment coil insertion side end 19b into a concave shape, a technique shown in FIG. 13 can be employed. A halfway product of a rectangular tube shaped slot liner 19 is inserted into a slot liner holder 53 having a circular inner surface having a circumference which is slightly shorter than a circumferential length of the slot liner and according to this, the halfway product spreads into a cylindrical shape and is fixed. A rotary bar 54 is applied to the segment coil insertion side end. 19b of the slot liner 19 which spreads into the cylindrical shape projecting from the end surface of the holder 53 by a predetermined length. According to this, the segment coil insertion side end 19b is formed into the concave shape.

Figure 14:
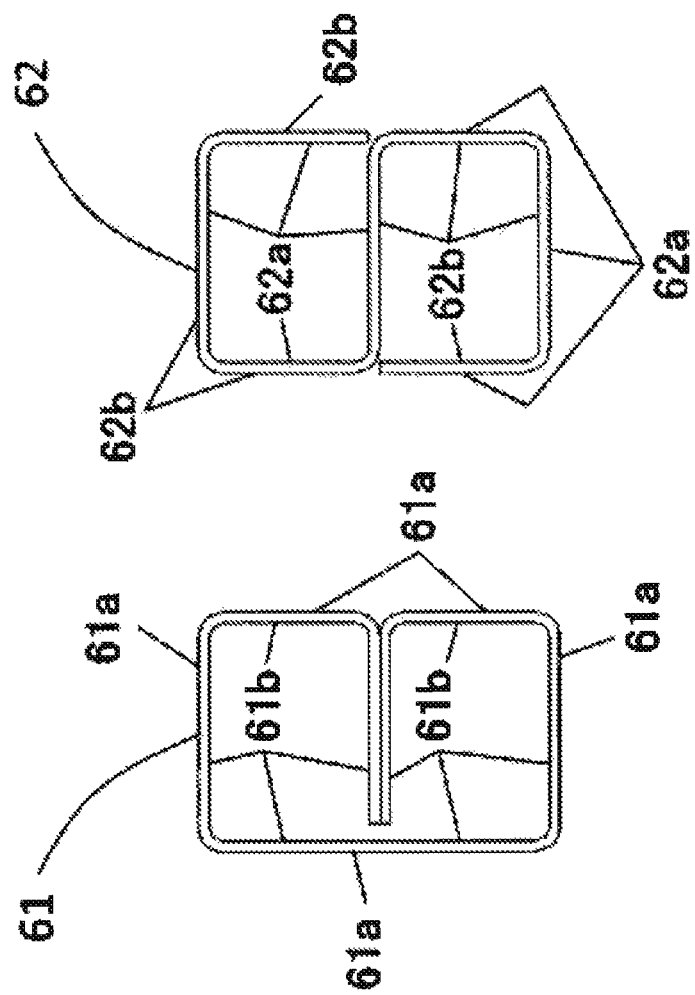
FIG. 14 is a transverse sectional view of a B-shaped slot liner and an S-shaped slot liner.

Although the slot liner having a rectangular cross section (traverse cross section) which is cut at a plane perpendicular to an extending direction of the slot liner is used in the above description, it is also possible to use a slot liner 61 having a B-shaped traverse cross section or a slot liner 62 having an S-shaped traverse cross section shown in FIG. 14. According to the B-shaped slot liner 61 and the S-shaped slot liner 62, two spaces surrounded by rectangular shapes exist at upper and lower locations in the drawing, and the segment coils 3 are inserted into the spaces from front direction or a depth direction in the drawing.

According to the B-shaped slot liner 61, one surface 61a of both surfaces of the insulating paper before the slot liner is formed into the B-shape appears on a B-shaped outer periphery when the slot liner is formed into the B-shape, and the one surface 61a comes into contact with the slot 4. The other surface 61b of the both surfaces of the insulating paper before the slot liner is formed into the B-shape appears on a B-shaped inner periphery when the slot liner is formed into the B-shape, and the other surface 61b comes into contact with the segment coils 3. Hence, it is possible to form the convex end 141 and the concave end 142 by the forming method of the convex end 141 and the concave end 142 used in the above-described Examples.

According to the S-shaped slot liner 62, one surface 62a of both surfaces of the insulating paper before the slot liner is formed into the S-shape appears on an inner surface surrounding upper one of two spaces surrounded by a rectangular shape when the slot liner is formed into the S-shape, and also appears on an outer surface surrounding a lower space. The other surface 62b of both surfaces of the insulating paper before the slot liner is formed into the S-shape appears on an outer surface surrounding upper one of the two spaces surrounded by the rectangular shape when the slot liner is formed into the S-shape, and also appears on the inner surface surrounding the lower space. Hence, when a slot liner is formed into an S-shape after insulating paper is cut into a constant length, it is necessary to provide an oblique surface corresponding to a contact surface between the slot 4 and the segment coil 3, and it is preferable to apply a technique for forming ends into a convex shape and a concave shape after the slot liner is formed and cut into a constant length.

Although the inclination angle of the inclined surface 142a of the concave end 142 is uniform from an inner peripheral surface to an outer peripheral surface of the slot liner 14 after it is formed into the rectangular shape as shown in FIG. 15 (a) in the above-described Examples, the present invention is not limited to this. For example, it is possible to make various modifications of the shape of the inclined surface 142a as shown in FIG. 15 (b) to 15 (f). FIG. 15 (a) to 15 (f) are sectional views (vertical sectional views) which are cut at a plane parallel to the extending direction of the slot liner, and these drawings show vicinity of a segment coil insertion side end.

For example, as shown in FIG. 15 (b), the inclined surface 142a may partially be provided on an inner peripheral side of a slot liner 151 after the inclined surface 142a is formed into a rectangular shape. Also, as shown in FIG. 15 (c), the inclined surface 142a may partially be provided on an inner peripheral side of a slot liner 152 after it is formed into a rectangular shape, and an inclined surface 142b having an inclination angle which is different from that of the inclined surface 142a may be provided from a left end of the inclined surface 142a in the drawing. In this manner, multiple inclined surfaces having different inclination angles may be provided. Further, a surface 142c formed by chamfering an outer peripheral end of a slot liner 153 may be provided as shown in FIG. 15 (d). Further, inclined surfaces 142d and 142e of slot liners 154 and 155 may be curved surfaces as shown in FIGS. 15(e) and 15 (f). The concave end 142 may be formed by appropriately combining the inclined surfaces 142a to 142e.

The second gradient angles 134 of the inclined surfaces 142a to 142e are defined as shown in FIG. 15 (a) to 15 (f). That is, the second gradient angle 134 is defined by an angle formed between an inner surface of the slot liner and a tangent of each inclined surface at an intersection between the inclined surfaces 142a, 142d and 142e and the inner surface of the slot liner in the present invention, a shape of an outer periphery in the vicinity of the concave end 142 is not limited to the shape of the surface 142c shown in FIG. 15 (d), and the shape of the outer periphery may be composed of multiple flat surfaces having different inclination angles or may be composed of a curved surface.

Although the insulating paper of the three-layered structure of aramid/PET/aramid is used in the description, the present invention is not limited to this, and a sheet-shaped insulating member made of other material may appropriately be used. The above-described Examples and Comparative Example may be combined with each other.

The present invention is not limited to the embodiment, and a rotating machine of the invention includes rotating machines of various kinds of structure. That is, the rotating machine including: a core provided with a slot which is in communication with the core in an axial direction thereof; a winding provided in the slot; and an insulating member provided between the slot and the winding; where in the insulating member, a first inclined surface provided on an insertion side into the slot and/or a second inclined surface provided on an insertion side of the winding is provided on an end of the core in its axial direction.

REFERENCE SIGN LIST 1 stator core
2, 14, 17, 18 slot liner
3 stator coil segment coil
4 slot
14a stator core insertion side end
14b segment coil insertion side end
41 stator 133 gradient angle (first gradient angle)
134 gradient angle (second gradient angle)
140 flat end
141 convex end
141a inclined surface
142 concave end
142a inclined surface

The invention claimed is:

1. A rotating machine, comprising:
 a core provided with a slot which is in communication with the core in an axial direction thereof;
 a winding provided in the slot; and
 an insulating member provided between the slot and the winding, wherein
  in the insulating member, a first inclined surface provided on an insertion side into the slot and/or a second inclined surface provided on an insertion side of the winding is provided on an end of the core in its axial direction,
  the insulating member is a sheet-shaped insulator which is bent into a cylindrical shape, and is provided with the first and/or second inclined surfaces,
  a first angle, formed between an inner peripheral surface of the insulating member and the first inclined surface that facilitates insertion of the insulating member into the slot, is an acute angle,
  a second angle, formed between the inner peripheral surface of the insulating member and the second inclined surface that facilitates insertion of the winding into the insulating member, is an obtuse angle, and
  an outer peripheral length of the end of the insulating member on a side of the first inclined surface becomes shorter in an insertion direction into the slot and is equal to or shorter than an outer peripheral length of a cylindrical part of the insulating member.

2. The rotating machine according claim 1, wherein the first inclined surface that facilitates insertion of the insulating member into the slot inclines toward the slot, and the second inclined surface that facilitates insertion of the winding into the insulating member inclines toward the winding.

3. The rotating machine according claim 2, wherein
 the winding includes multiple segment conductors each including a connecting portion and a folded-back portion, and the segment conductors are connected to each other through the connecting portion,
 the first inclined surface that facilitates insertion of the insulating member into the slot is placed on a side of the connecting portion in the axial direction of the core, and
 the second inclined surface that facilitates insertion of the winding into the insulating member is placed on a side of the folded-back portion.

4. The rotating machine according claim 1, wherein
 when the insulating member is provided with the first inclined surface for facilitating insertion of the insulating member into the slot, the first inclined surface inclines toward the slot, and
 when the insulating member is provided with the second inclined surface for facilitating insertion of the winding into the insulating member, the second inclined surface inclines toward the winding.

5. The rotating machine according claim 4, wherein
 the winding includes multiple segment conductors each including a connecting portion and a folded-back portion, and the segment conductors are connected to each other through the connecting portion,
 when the insulating member is provided with the first inclined surface that facilitates insertion of the insulating member into the slot, the first inclined surface is placed on a side of the connecting portion in the axial direction of the core, and
 when the insulating member is provided with the second inclined surface that facilitates insertion of the winding into the insulating member, the second inclined surface is placed on a side of the folded-back portion in the axial direction of the core.

* * * * *